United States Patent
De Vries et al.

(10) Patent No.: US 8,512,494 B2
(45) Date of Patent: Aug. 20, 2013

(54) METHOD FOR MANUFACTURING A GREEN TYRE USING A BUILDING DRUM AND A TRANSFER DEVICE

(75) Inventors: Wubbo Pieter De Vries, Hoogeveen (NL); Gerrit Mulder, Oene (NL)

(73) Assignee: VMI Holland B.V., Epe (NL)

( * ) Notice: Subject to any disclaimer, the term of this patent is extended or adjusted under 35 U.S.C. 154(b) by 389 days.

(21) Appl. No.: 12/427,807

(22) Filed: Apr. 22, 2009

(65) Prior Publication Data
US 2009/0266473 A1    Oct. 29, 2009

Related U.S. Application Data

(60) Provisional application No. 61/125,533, filed on Apr. 25, 2008.

(51) Int. Cl.
*B29C 35/00* (2006.01)

(52) U.S. Cl.
USPC .................. 156/110.1; 156/394.1; 156/406.2; 156/414

(58) Field of Classification Search
USPC .......................... 156/110.1, 394.1, 406.2, 414
See application file for complete search history.

(56) References Cited

U.S. PATENT DOCUMENTS 5,413,653 A * 5/1995 Kondo et al. ................. 156/111
5,464,489 A * 11/1995 De Graaf ...................... 156/126

* cited by examiner

*Primary Examiner* — Katarzyna Wyrozebski Lee
*Assistant Examiner* — Joshel Rivera
(74) *Attorney, Agent, or Firm* — Ladas & Parry LLP

(57) ABSTRACT

Method for manufacturing a green tire using a building drum and a transfer device. In the method tire components are arranged on a building drum. In one step of the method the transfer device is placed around the building drum. The method further comprises a step during which a last manufacturing process for a green tire is carried out on the building drum, and a removal step during which a removal device removes the green tire from the building drum, wherein the removal device is provided with projecting elements that can be placed up to a distance from and around the outer circumference of the green tire and which projecting elements can be placed such so as to engage the outer side of the green tire. The removal step further comprises during the step in which the transfer device is placed around the building drum, placing the projecting elements up to a distance from and around the outer circumference of the building drum.

7 Claims, 4 Drawing Sheets

Figure 1A:
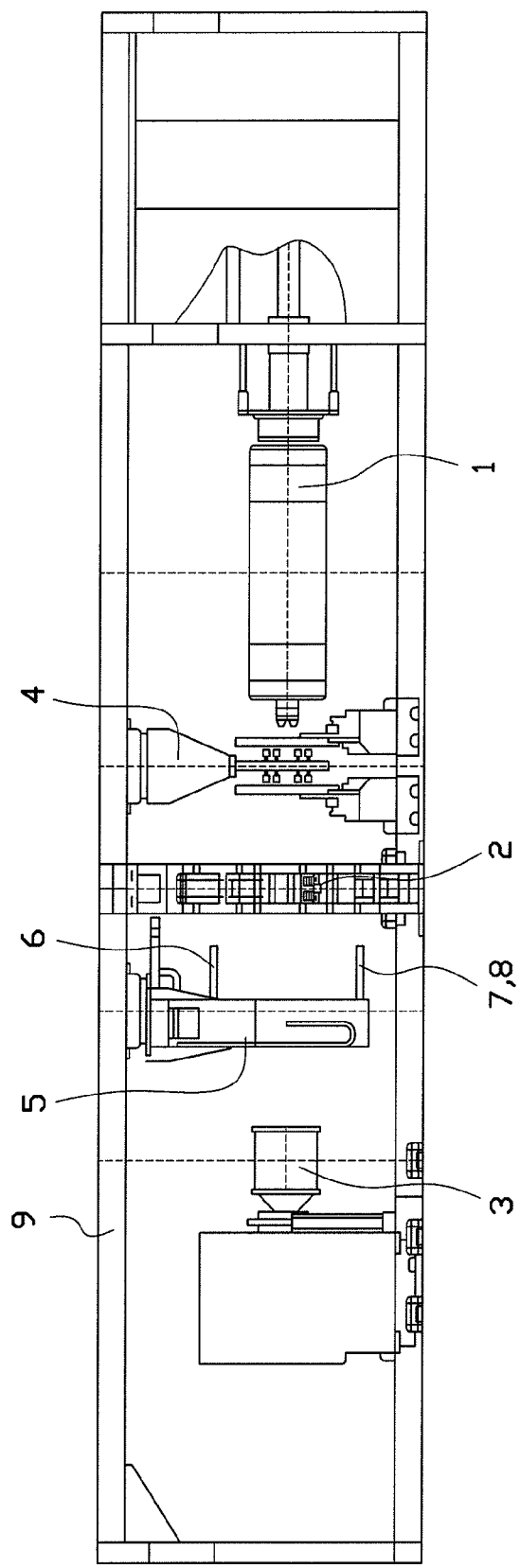

METHOD FOR MANUFACTURING A GREEN TYRE USING A BUILDING DRUM AND A TRANSFER DEVICE

This application claims the benefit of U.S. Provisional Application No. 61/125,533, filed Apr. 25, 2008, and incorporates the same by reference

BACKGROUND OF THE INVENTION

The present invention relates to a method for manufacturing a green tyre using a building drum and a transfer device, which method comprises a step of arranging tyre components for the green tyre on a building drum, a step during which the transfer device is placed around the building drum, a step during which a last manufacturing process for a green tyre is carried out on the building drum, and a removal step during which a removal device removes the green tyre from the building drum, wherein the removal device is provided with projecting elements that can be placed up to a distance from and around the outer circumference of the green tyre and which projecting elements can be placed such so as to engage the outer side of the green tyre.

Such a method is for instance known from EP-0 719 632, A2.

SUMMARY OF THE INVENTION

It is an object of the present invention to provide an alternative method.

For that purpose according to the invention a method for manufacturing a green tyre using a building drum and a transfer device of the type mentioned in the preamble is characterised in that the removal step further comprises during the step in which the transfer device is placed around the building drum, placing the projecting elements up to a distance from and around the outer circumference of the building drum. In this way the projecting elements of the removal device can already be placed in position around the as yet not completely finished green tyre at the moment that the last production steps still have to be carried out or completed. This results in a considerable saving of time. In the method according to EP-0 719 632, A2, the projecting elements of the removal device are not placed around the green tyre until the green tyre has completely been finished, which green tyre is subsequently removed from the building drum by the removal device. At an earlier stage the transfer device has already been moved from a position around the building drum into a position spaced apart from the building drum. Although in principle said method is able to deliver green tyres of good quality, the time needed for manufacturing a green tyre is relatively long.

In an advantageous embodiment of a method according to the invention placing the projecting elements up to a distance from and around the outer circumference of the building drum is carried out before the last manufacturing process has been ended. In that way even more time is saved.

In a simple embodiment of a method according to the invention the method comprises the steps of selecting a transfer ring for the transfer device which ring comprises radially movable retaining elements for retaining the tyre components, wherein the removal step further comprises: after ending the last manufacturing process moving the retaining elements from a first inactive position in which the retaining elements are radially farthest removed from each other and wherein the retaining elements are spaced apart from each other in circumferential direction into an active position in which the retaining elements abut the tyre components in question; when the retaining elements are in the active position, moving the building drum away from the transfer ring, after which the projecting elements are brought into engagement with the outer side of the green tyre; and subsequently moving the retaining elements towards the inactive position. By selecting such a transfer ring it can be ensured in a mechanically relatively easy way that the projecting elements in the step in which the transfer ring is placed around the building drum, can be placed around the building drum. Because the retaining elements are brought into the active position before the projecting elements are brought into engagement with the green tyre, in case of some types of green tyres (for instance those with relatively limp side walls) it is prevented that the green tyre collapses prior to removal.

SHORT DESCRIPTION OF THE DRAWINGS

Figure 1B:
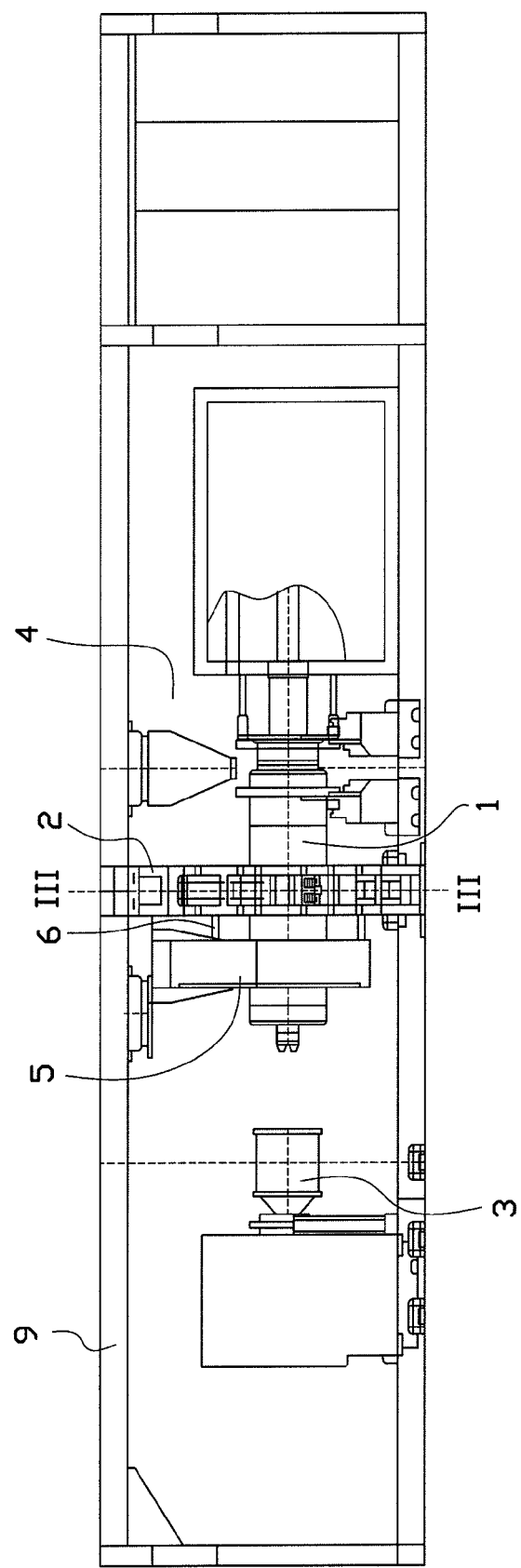
Figure 2A:
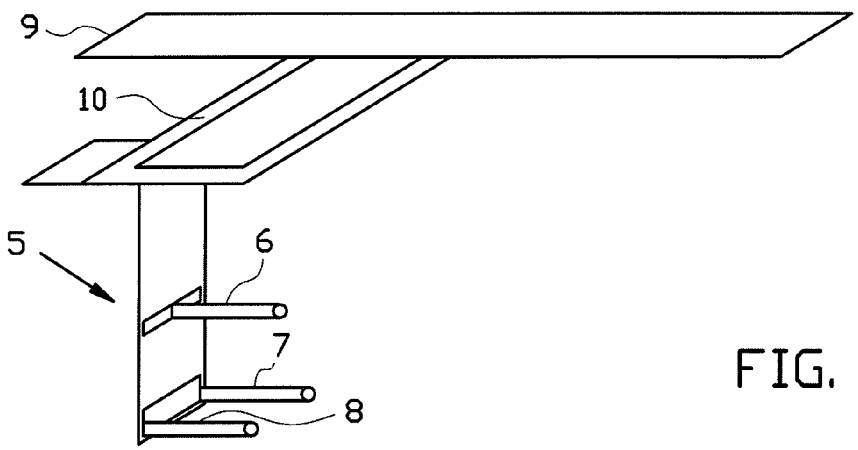
Figure 2B:
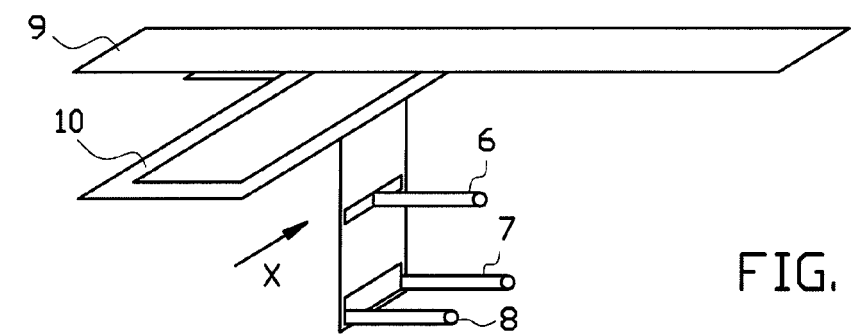
Figure 2C:
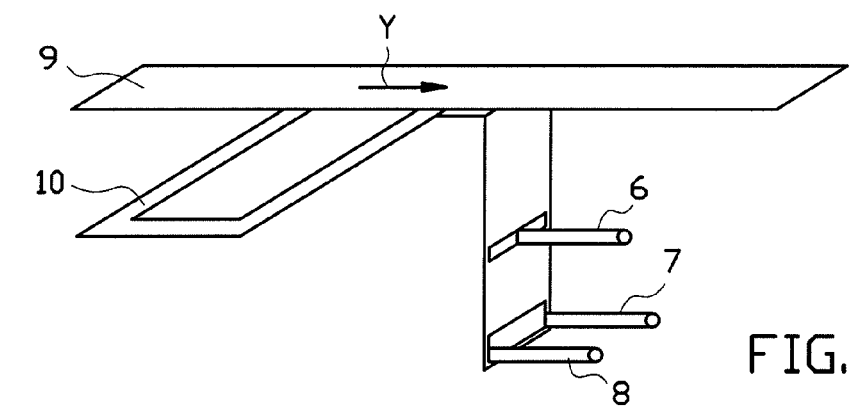
Figure 2D:
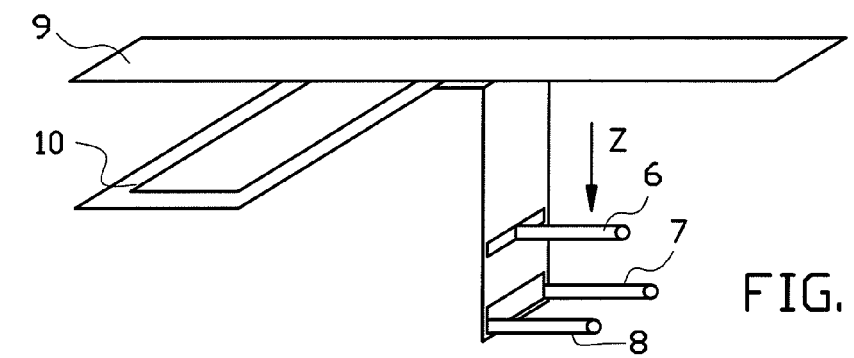

The invention will be elucidated on the basis of a number of exemplary embodiments shown in the attached drawings, in which:

FIG. 1A schematically in side view shows a device for manufacturing a green tyre, which device is provided with a building drum and spaced apart therefrom a transfer device, with which device the inventive method can be carried out, FIG. 1B shows the device of FIG. 1A at the a stage of the method in which the transfer device is placed around the building drum, and the projecting elements of the removal device have been placed between the building drum and the transfer device;

FIGS. 2A-2D schematically show the movement of the removal device; and

Figure 3:
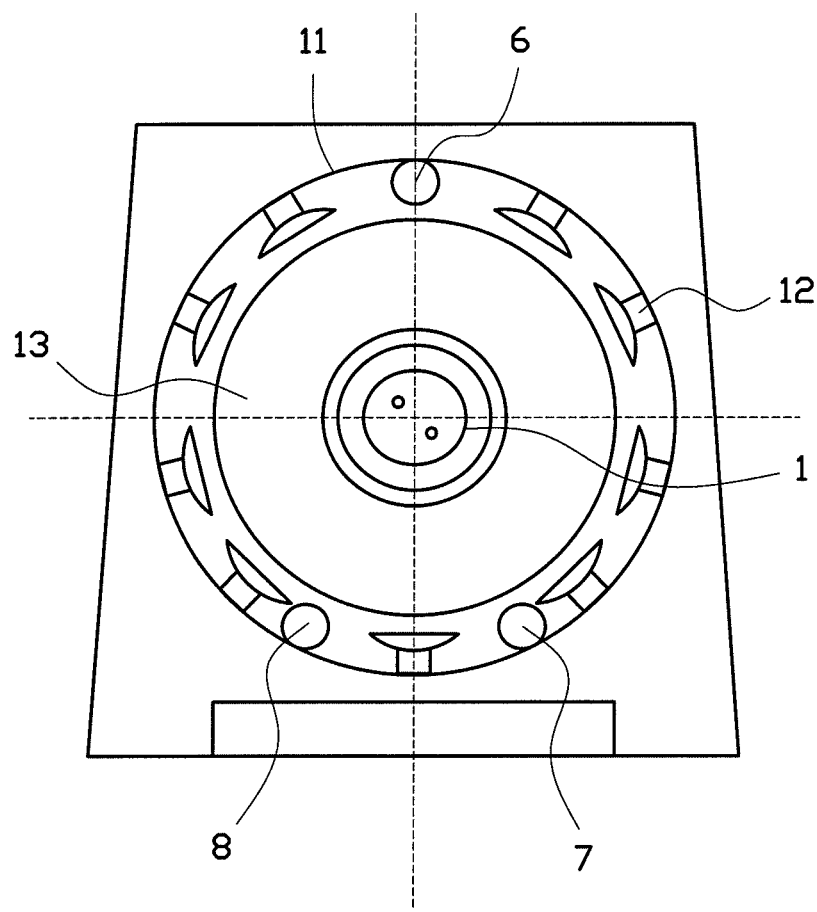

FIG. 3 schematically shows a cross-section according to the line III-III of FIG. 1B.

DETAILED DESCRIPTION OF THE DRAWINGS

FIG. 1A schematically shows a side view of a device for manufacturing a green tyre. The device is provided with a building drum 1 and spaced apart therefrom a transfer device 2. In the embodiment shown the building drum 1 is movable towards and away from the transfer device 2, which in the embodiment shown is designed so as to be stationary, yet alternatively the transfer device can be designed so as to be movable and the building drum stationary, or both can be designed so as to be movable. Furthermore a removal device 5 having projecting elements 6, 7, 8 is provided which in one step of the method is used for removing the green tyre from the building drum 1. In that case the projecting elements 6, 7, 8 can be placed up to a distance from and around the outer circumference of the green tyre arranged on the building drum and can also be placed such so as to engage the outer side of the green tyre.

The method described below can be carried out with said device shown as an example.

In a way that is not further described, but which is known per se the method for manufacturing a green tyre comprises a step of arranging tyre components for a green tyre on the building drum 1. Reference may for instance be made to EP-0 719 632, A2. Optionally another building drum 3 may be present on which other tyre components can be arranged, which via the transfer device can be transferred to the building drum 1. Moreover other devices that are known per se, such as a bead device 4 for placing beads may be present. Said additional devices will not be further described here, in order not to make the subject of the invention unnecessarily unclear.

As schematically shown in FIG. 1B at one stage of the method the transfer device 2 is placed around the building drum 1. In said position it is common that a last manufacturing process for manufacturing the green tyre is carried out on the building drum 1. A last manufacturing process may for instance be pressing rollers against the tyre components while the building drum rotates. According to the invention it will then also be possible that the projecting elements, 6, 7, 8 of the removal device 5 are placed between the building drum 1 and the transfer device 2. In that case the projecting elements 6, 7, 8 can be placed up to a distance from and around the outer circumference of the green tyre, as is elucidated on the basis of FIG. 3. In that way the projecting elements 6, 7, 8 of the removal device 5 can already be placed in position around the as yet not completely finished green tyre at the moment that the last production steps have yet to be carried out, or when they have not yet been completed. This results in a considerable saving of time. Up until now a removal device has always been used that was not placed in a position around the green tyre until after the green tyre had been completely finished, the present invention breaks with this common way of operating as a result of which a considerable saving of time is achieved.

As shown in the embodiment of FIGS. 1A and 1B the removal device 5 is suspended from an upper rail 9, which is also schematically shown in FIGS. 2A-2D. By means of transverse rail 10 the removal device 5 can be placed beyond the path of the rail 9, so that the removal device 5 can be brought in a position in which it does not hinder other parts of the device for manufacturing the green tyre. The movement of the removal device in x and y direction is indicated by arrows in question. The arrow in the direction z indicates that the projecting elements 6, 7, 8 can be moved towards each other to clamp the green tyre. Said movement towards each other of the projecting elements is known per se from EP-0 716 632, A2. It will be clear that the removal device in an alternative embodiment may also be arranged on a bottom rail, or on a robot arm ensuring that the projecting elements can be brought up into the transfer device and around the building drum.

FIG. 3 schematically shows a cross-section according to line III-III of FIG. 1B. Here it can be seen that the transfer device is a transfer ring 11 comprising radially movable retaining elements 12 for retaining the tyre components 13. Such a transfer ring is known per se, for instance from EP-0 719 632, A2, or EP-0 223 317, A1. For retaining the tyre components the transfer ring 11 is first placed around the building drum 1, after which the retaining elements 12 are moved from a first inactive position (as shown in FIG. 3) in which the retaining elements 12 are radially farthest removed from each other, into an active position (not shown) in which the retaining elements 12 abut the tyre components 13 in question. As can be seen in FIG. 3 the retaining elements 12 in the inactive position are spaced apart from each other in circumferential direction. According to the invention, when the retaining elements 12 are in the inactive position, the projecting elements 6, 7, 8 of the removal device are placed between adjacently situated retaining elements 12 in question. This may take place during or prior to the last operation before finishing the green tyre. When said last operation has been completed, the retaining elements 12 are brought in the active position, in which they retain the green tyre. In a manner known per se the building drum 1 is subsequently moved away from the transfer ring 2, after which the projecting elements 6, 7, 8 only need to be moved towards each other for engaging the green tyre, which then as a result of a suitable movement of the removal device can be removed from the building drum 1. Shortly retaining the green tyre by the retaining elements 12 prior to the projecting elements 6, 7, 8 engaging the green tyre, may in case of green tyres having relatively firm side walls (for instance intended for so-called run flat tyres) be optionally dispensed with.

Although in the shown embodiments three projecting elements are shown, it will be clear to an expert that any other suitable number of projecting elements can also be applied within the invention. It is furthermore possible in alternative embodiments of the invention that the position of the projecting elements differs from the position as shown in the figures. For instance it is possible in the last operation in manufacturing a green tyre that rollers press the tyre components against each other. The projecting elements will then of course be placed such so as not to interfere with the rollers.

The above description is included to illustrate the operation of preferred embodiments of the invention and not to limit the scope of the invention. Starting from the above explanation many variations that fall within the spirit and scope of the present invention, particularly as defined in the attached claims, will be evident to an expert.

The invention claimed is:

1. Method for manufacturing a green tyre using a building drum (1) and a transfer device (2), which method comprises:
   a step of arranging tyre components (13) for the green tyre on a building drum (1),
   a step during which the transfer device (2) is placed around the building drum (1),
   a step during which a last manufacturing process for a green tyre is carried out on the building drum (1), and
   a removal step during which a removal device (5) removes the green tyre from the building drum, wherein the removal device (5) is provided with projecting elements (6, 7, 8) that can be inserted into the transfer device (2), and wherein the projecting elements (6, 7, 8) can be placed up to a distance from and around the outer circumference of the green tyre and wherein the projecting elements (6, 7, 8) can be placed so as to engage the outer side of the green tyre, wherein the removal step further comprises, during the step in which the transfer device (2) is placed around the building drum (1), moving the removal device (5) with its projecting elements (6, 7, 8) with respect to the transfer device (2) in an axial direction of the building drum (1) from a position outside the green tyre into a position wherein the projecting elements (6, 7, 8) are inserted in a radial space that extends between the outer side of the green tyre and the transfer device (2) that is around the green tyre, wherein the projecting elements (6, 7, 8) are disposed up to a distance from and around the outer circumference of the building drum (1), wherein the projecting elements (6, 7, 8) of the removal device (5) are placed between the building drum (1) and the transfer device (2).

2. Method according to claim 1, wherein the step of placing the projecting elements (6, 7, 8) up to a distance from and around the outer circumference of the building drum (1) is carried out before the last manufacturing process has been completed.

3. Method according to claim 1, wherein the method comprises the steps of:
   selecting a transfer ring (11) for the transfer device (2) which ring comprises radially movable retaining elements (12) for retaining the tyre components (13),
   wherein the removal step further comprises: after ending the last manufacturing process moving the retaining elements (12) from a first inactive position in which the retaining elements (12) are radially farthest removed from each other and wherein the retaining elements (12) are spaced apart from each other in circumferential direction into an active position in which the retaining elements (12) abut the tyre components; when the retaining elements (12) are in the active position, moving the building drum (1) away from the transfer ring (11), after which the projecting elements (6, 7, 8) are brought into engagement with the outer side of the green tyre; and subsequently moving the retaining elements (12) towards the inactive position.

4. Method according to claim 2, wherein the method comprises the steps of:

selecting a transfer ring (11) for the transfer device (2) which ring comprises radially movable retaining elements (12) for retaining the tyre components (13), wherein the removal step further comprises: after ending the last manufacturing process moving the retaining elements (12) from a first inactive position in which the retaining elements (12) are radially farthest removed from each other and wherein the retaining elements (12) are spaced apart from each other in circumferential direction into an active position in which the retaining elements (12) abut the tyre components; when the retaining elements (12) are in the active position, moving the building drum (1) away from the transfer ring (11), after which the projecting elements (6, 7, 8) are brought into engagement with the outer side of the green tyre; and subsequently moving the retaining elements (12) towards the inactive position.

5. A method for manufacturing a green tyre, comprising the steps of:

(a) providing an apparatus comprising a building drum, a transfer device comprising a plurality of retaining elements and a removal device comprising a plurality of projecting elements, the removal device being movable with respect to the building drum and the transfer device;

(b) arranging tyre components for the green tyre on the building drum for manufacture of the green tyre and disposing the transfer device around the building drum with the projecting elements of the removal device in a first position spaced from the building drum and transfer device in an axial direction of the building drum;

(c) moving the removal device with its projecting elements with respect to the transfer device in an axial direction of the building drum to a second position in which the projecting elements are positioned around the building drum and inserted between the retaining elements of the transfer device before manufacture of the green tyre is completed; and (d) completing manufacture of the green tyre and removing the green tyre from the building drum after manufacture of the green tyre is completed.

6. The method according to claim 5, wherein the removing step (d) comprises, after manufacture of the green tyre is completed, moving the retaining elements of the transfer device from an inactive position spaced from the tyre to an active position abutting the tyre, moving the building drum away from the transfer device and removal device, bringing the projecting elements of the removal device into engagement with the tyre, and subsequently moving the retaining elements of the transfer device to the inactive position.

7. The method according to claim 6, wherein the apparatus comprises means for movement of the removal device in respective x and y directions so that the removal device can be moved to and from the first position in which it does not hinder other devices used to manufacture the green tyre until it is moved to the second position in step (c).

\* \* \* \* \*